United States Patent [19]

Dolce

[11] 4,002,581
[45] Jan. 11, 1977

[54] FOAMED THERMOPLASTIC COMPOSITIONS OF A LINEAR POLYESTER AND AN IONICALLY CROSSLINKED COPOLYMER

[75] Inventor: Thomas Joseph Dolce, Stirling, N.J.

[73] Assignee: General Electric Company, Pittsfield, Mass.

[22] Filed: Dec. 8, 1975

[21] Appl. No.: 638,807

[52] U.S. Cl. .................. 260/2.5 N; 260/2.5 HA; 260/2.5 H; 260/2.5 FP; 260/40 R; 260/873; 260/DIG. 24
[51] Int. Cl.$^2$ .......................................... C08J 9/06
[58] Field of Search .......... 260/873, 2.5 N, 2.5 HA

[56] References Cited

UNITED STATES PATENTS

| | | | |
|---|---|---|---|
| 3,322,734 | 5/1967 | Rees | 260/2.5 HA |
| 3,671,487 | 6/1972 | Abolins | 260/873 |
| 3,867,319 | 2/1975 | Lundberg | 260/2.5 HA |

*Primary Examiner*—Morton Foelak
*Attorney, Agent, or Firm*—William F. Mufatti; Edward A. Hedman; James V. Costigan

[57] ABSTRACT

Novel foamed thermoplastic compositions are disclosed that comprise a polyester resin, such as poly(1,4-butylene terephthalate); an ionically crosslinked copolymer of an α-olefin and an α,β-ethylenically unsaturated mono- or dicarboxylic acid, and a polytetrafluoroethylene resin.

16 Claims, No Drawings

FOAMED THERMOPLASTIC COMPOSITIONS OF A LINEAR POLYESTER AND AN IONICALLY CROSSLINKED COPOLYMER

This invention relates to novel foamed thermoplastic compositions which include a polyester resin, such as poly-(1,4-butylene terephthalate); an ionically crosslinked copolymer of an α-olefin and an α,β-ethylenically unsaturated mono- or dicarboxylic acid and a polytetrafluoroethylene resin.

BACKGROUND OF THE INVENTION

High molecular weight linear polyesters and copolyesters of terephthalic and isophthalic acid are well known in the prior art. These polymers are described in the literature and in Whinfield et al., U.S. Pat. No. 3,465,319 and Pengilly, U.S. Pat. No. 3,047,539 which are hereby incorporated by reference.

The linear polyesters have been employed for various thermoplastic molding applications and in the preparation of foamed structures. While these foamed structures have good physical properties, it is advantageous to provide polyester foamed compositions that have increased toughness as shown by an increase in tests that evaluate the elongation to break properties of these compositions.

It has now been found that the use of a minor amount of a ionically crosslinked copolymer and a minor amount of a polytetrafluoroethylene resin in a foamed linear polyester composition will result in a tougher product having improved properties. Surprisingly, it has been found that not all of the ionically crosslinked copolymers are effective in increasing the toughness of foamed linear polyesters. In particular, those ionically crosslinked copolymers that are crosslinked with zinc do not produce this effect.

Therefore, it is a primary object of this invention to provide an improved foamed linear polyester composition.

It is also an object of this invention to provide a foamed linear polyester composition that has increased toughness as evaluated by tests that determine the elongation to break properties of these compositions.

DETAILED DESCRIPTION OF THE INVENTION

The novel foamed linear polyesters of the present invention will comprise:

a. a linear polyester resin;

b. a minor amount of a polytetrafluoroethylene resin; and c. a minor amount of a copolymer selected from the class consisting of polymers of α-olefins having the general formula $RCH=CH_2$ where R is a radical selected from the class consisting of hydrogen and alkyl radicals having from 1 to 8 carbon atoms, the olefin content of said polymer being at least 50 mole percent, based on the polymer, and an α,β-ethylenically unsaturated mono-or dicarboxylic acid, the acid monomer content of said polymer being from 0.2 to 25 mole percent, based on the polymer, said mono carboxylic acid polymer containing uniformly distributed throughout the polymer a metal ion having a valence of 1 to 3 inclusive, and is selected from the group consisting of $Na^+$, $K^+$, $Li^+$, $Cs^+$, $Ag^+$, $Hg^+$, $Cu^+$, $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$, $Al^{+3}$, $Se^{+3}$, $Fe^{+3}$ and $Y^{+3}$, and said dicarboxylic acid polymer containing a monovalent such ion.

The preferred linear polyesters are selected from the group consisting of polymeric glycol terephthalate and isophthalate esters of the general formula:

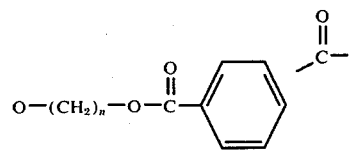

wherein n is a whole number of from 2 to 4, and mixtures of such esters. The preferred polyester is poly(1,4-butylene terephthalate). Also included are the branched copolyesters of poly(1,4-butylene terephthalate).

These copolyesters are branched either by crosslinking through chemical linkages or by other known methods. They may contain minor amounts of e.g., from 0.5 to 15 mole percent of the total 1,4-butylene units, of other aliphatic linkages, e.g., those of from 2 to 10 carbon atoms, such as dimethylene, trimethylene, hexamethylene, decamethylene and the like linkages, as well as cycloaliphatic, e.g., 1,4-dimethylene-cyclohexane linkages. In addition to the terephthalic acid units, other dicarboxylic acid units such as adipic, naphthalene dicarboxylic, isophthalic, and orthophthalic units may be present in small amounts, e.g., from about 0.5 to about 15 mole percent of the total acid units.

Especially useful are branched high melt viscosity poly(1,4-butylene terephthalate) resins, which include a small amount of a branching component containing at least three ester forming components. The branching component may be one which provides branching in the acid unit portion of the polyester, or in the glycol unit portion, or it may be a hybrid. Illustrative of such branching components are tri- or tetracarboxylic acids, such as trimesic acid, pyromellitic acid and lower alkyl esters thereof, and the like, or preferably, polyols, and especially preferably, tetrols, such as trimethylolpropane; or dihydroxy carboxylic acids and hydroxydicarboxylic acids and derivatives such as dimethyl hydroxyterephthalate and the like.

The relative amount of branching component may vary, but it is always kept at a minor proportion, e.g., of up to 5 mole percent maximum, for every 100 moles of the terephthalate units in the branched polyester. Preferably, the range of branching component included in the esterification mixture (and, generally, that included in the product) will be from 0.01 to 3 mole percent based on the terephthalate units. Especially preferably, it will comprise from about 0.02 to about 1 mole percent, based on the terephthalate component.

The ionic copolymers preferably comprise a polymer of an α-olefin having the general formula $RCH=CH_2$ wherein R is a radical selected from the group consisting of hydrogen and alkyl radicals having from 1 to 8 carbon atoms inclusive, the olefin content of said polymer being at least 50 mole percent based on the polymer, and an α,β-ethylenically unsaturated monocarboxylic acid having from 3 to 8 carbon atoms, the acid monomer content of said polymer being from 0.2 to 25 mole percent based on the polymer, said polymer containing a metal ion selected from the group consisting of ions of alkali metals and alkaline earth metals uniformly distributed through the polymer in sufficient quantity to neutralize at least 10 percent of said carboxylic acid monomer.

The preferred alkali metal ion is Na$^+$ although K$^+$ and Li$^+$ ions may be employed. Preferred polymers will employ ethylene as the α-olefin and arylic or methacrylic acid as the α,β-ethylenically unsaturated carboxylic acid monomer.

The ionically cross-linked polymer components can be made by known methods and they are available commercially. They are described in the Encyclopedia of Polymer Science and Technology, John Wiley & Sons, Inc., New York, Volume 6, 1967, pages 420–431, and in references cited therein. They are also described in Modern Plastics Encyclopedia, McGraw-Hill, Co., New York, Volume 51, No. 10A, October 1974, pages 40 and 49. In general, they are transparent, moldable resins having a specific gravity of 0.93–0.96 g./cc., a specific volume of 30.0–29.0 cu. in./lb., a Shore D hardness, when molded, of 50–65, a volume resistivity of $>10^{16}$ ohm-cm; a refractive index of about 1.51 and excellent resistance to attack by alkalis and organic solvents. They are commercially available from the duPont Company under the trade name Surlyn Ionomers.

The ionically cross-linked polymer components useful in this invention can be made following the teachings of Rees, Canadian Patent No. 674,595, Nov. 19, 1963. In one illustrative procedure, 300 g. of an ethylene/methacrylic acid copolymer containing 10 wt. % of methacrylic acid is milled at 150° C. and then 24 g. of sodium methoxide in 100 ml. of methanol is worked into the hot copolymer. The mixture is worked for an additional 15 minutes, during which time the initially soft, fluid melt becomes stiff and rubbery. It is sheeted off, cooled and comminuted for use. The other materials within the scope of above-defined family can be obtained in a like manner by substituting appropriate copolymers, and strontium hydroxide, magnesium acetate, sodium hydroxide, etc. for the sodium methoxide. Instead of using copolymers formed from the monomers, grafts of acrylic acid, for example, onto polypropylene or polyethylene, can also be substituted.

The compositions of the invention will comprise from about 95 to about 99.9 parts by weight of the linear polyester resin; from about 5 to about 0.1 parts by weight of ionically cross-linked copolymer and from about 5 to about 0.1 parts by weight of polytetrafluoroethylene resin. The preferred compositions will include from about 99 to about 98.8 parts by weight of the linear polyester; from about 0.2 to 1 part by weight of the ionically cross-linked copolymers and from about 0.2 to 1 part by weight of polytetrafluorethylene resin.

The foamed linear polyester compositions of the present invention may include flame-retardant quantities of flame-retardant agents and/or reinforcing amounts of reinforcing fillers. Useful flame retardants are disclosed in U.S. Pat. Nos. 3,833,685, 3,334,154 and 3,671,487 which are hereby incorporated by reference.

In general, the flame retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus and nitrogen. It is preferred that the flame-retardant additive comprise a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds or a mixture of two or more of the foregoing.

The amount of flame-retardant additive used is not critical to the invention, so long as it is present in a minor proportion based on said composition — major proportions will detract from physical properties — but at least sufficient to render the polyester resin nonburning or self-extinguishing. Those skilled in the art are well aware that the amount will vary with the nature of the resin and with the efficiency of the additive. In general, however, the amount of additive will be from 0.5 to 50 parts by weight per hundred parts of resin. A preferred range will be from about 3 to 25 parts and an especially preferred range will be from about 8 to 12 parts of additive per 100 parts of resin. Smaller amounts of compounds highly concentrated in the elements responsible for flame-retardance will be sufficient, e.g., elemental red phosphorus will be preferred at 0.5 to 2.0 parts by weight per hundred parts of resin, while phosphorus in the form of triphenyl phosphate will be used at 25 parts of phosphate per 100 parts of resin, and so forth. Halogenated aromatics will be used at 8 to 12 parts and synergists, e.g., antimony oxide, will be used at about 2 to 5 parts by weight per 100 parts of resin.

Among the useful halogen-containing compounds are those of the formula

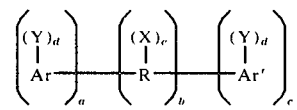

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; amine; a sulfur containing linkage, e.g., sulfide, sulfoxide, sulfone; a phosphorus-containing linkage; and the like. R can also consist of two or more alkylene or alkylidene linkages connected by such groups as aromatic, amino, ether, carbonyl, sulfide, sulfoxide, sulfone, a phosphorus-containing linkage, and the like. Other groups which are represented by R will occur to those skilled in the art.

Ar and Ar' are mono- or polycarbocyclic aromatic groups such as phenylene, biphenylene, terphenylene, napthtylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl, e.g., phenyl, nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter $d$ represents a whole number ranging from 1 to a maximum equivalent to the number of replaceable hydrogens substituted on the aromatic rings comprising Ar or Ar'. The letter $e$ represents a whole number ranging from to a maximum controlled by the number of replaceable hydrogens on R. The letters $a$, $b$ and $c$ represent whole numbers including 0. When $b$ is not 0, neither $a$ nor $c$ may be 0. Otherwise either $a$ or $c$, but not both, may be 0. Where $b$ is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are biphenyls of which the following are representative:

2,2-bis-(3,5-dichlorophenyl)propane
bis-(2-chlorophenyl)methane
bis-(2,6-dibromophenyl)methane
1,1-bis-(4-iodophenyl)ethane
1,2-bis(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,6-bis-(4,6-dichloronaphthyl)propane
2,2-bis-(2,6-dichlorophenyl)pentane
2,2-bis-(3,5-dichlorophenyl)hexane
bis-(4-chlorophenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis(3,5-dichloro-4-hydroxyphenyl)propane
2,2-bis-(3-bromo-4-hydroxyphenyl)propane The preparation of these and other applicable biphenyls are known in the art. In place of the divalent aliphatic group in the above examples may be substituted sulfide, sulfoxy and the like.

Included within the above structural formula are substituted benzenes exemplified by 1,3-dichlorobenzene, 1,4-dibromobenzene, 1,3-dichloro-4-hydroxybenzene, hexachlorobenzene, hexabromobenzene, and biphenyls such as 2,2'-dichlorobiphenyl, 2,4'-dibromobiphenyl, and 2,4'-dichlorobiphenyl.

Aromatic carbonate homopolymers having repeating units of the formula:

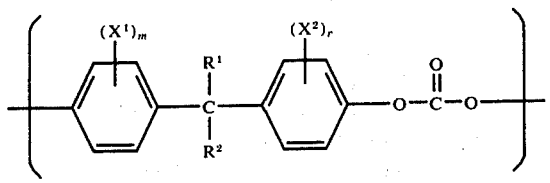

wherein $R^1$ and $R^2$ are hydrogen, (lower) alkyl or phenyl, $X^1$ and $X^2$ are bromo or chloro and $m$ and $r$ are from 1 to 4. These materials may be prepared by techniques well known to those skilled in the art.

Also aromatic carbonate copolymers in which from 25 to 75 wt. percent of the repeating units comprise chloro- or bromo-substituted dihydric phenol, glycol or dicarboxylic acid units.

The preferred halogen compounds for this invention are aromatic halogen compounds such as halogenated polycarbonates, chlorinated benzene, brominated benzene, chlorinated biphenyl, chlorinated terphenyl, brominated biphenyl, brominated terphenyl, or a compound comprising two phenyl radicals separated by a divalent alkylene or oxygen group and having at least two chlorine or bromine atoms per phenyl nucleus, and mixtures of at least two of the foregoing.

Especially preferred are the above-described halogenated polycarbonates, alone, or mixed with antimony oxide.

In general, the preferred phosphate compounds are selected from elemental phosphorus or organic phosphonic acids, phosphonates, phosphinates, phosphonites, phosphinites, phosphene oxides, phosphenes, phosphites or phosphates. Illustrative are triphenyl phosphene oxide. This can be used alone or mixed with hexabromobenzene or a chlorinated biphenyl and, optionally, antiomony oxide.

Typical or the preferred phosphorus compounds to be employed in this invention would be those having the general formula:

where each Q represents the same or different radicals including hydrocarbon radicals such as alkyl, cycloalkyl, aryl, alkyl substituted aryl and aryl substituted alkyl; halogen; hydrogen and combinations thereof provided that at least one of said Q's is aryl. Typical examples of suitable phosphates include, phenylbisdodecyl phosphate, phenylbisneopentyl phosphate, phenylethylene hydrogen phosphate, phenyl-bis-(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis(2-ethylhexyl)phenyl phosphate, tri-(nonyl-phenyl) phosphate, phenylmethyl hydrogen phosphate, di(dodecyl) p-tolyl phosphate, tricresyl phosphate, triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, diphenyl hydrogen phosphate, and the like. The preferred phosphates are those where each Q is aryl. The most preferred phosphate is triphenyl phosphate. It is also preferred to use triphenyl phosphate in combination with hexabromobenzene and, optionally, antimony oxide.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl) phosphine oxide or tetrakis(hydroxymethyl)phosphonium chloride. These flame-retardant additives are commercially available.

As reinforcing fillers, there may be employed reinforcing amounts of reinforcing filler. In general, any reinforcement can be used, e.g., aluminum, iron or nickel, and the like, and non-metals, e.g., carbon filaments, silicates, such as acicular calcium silicate, asbestos, $TiO_2$, potassium titanate and titanate whiskers, glass flakes and fibers and the like. It is to be understood that, unless the filler adds to the strength and stiffness of the composition, it is only a filler and not a reinforcing filler as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a) and (b) will comprise from about 10 to about 90 parts by weight and the filler will comprise from about 10 to about 90 parts by weight of the total composition.

In particular, the preferred reinforcing fillers are of glass and it is preferred to use fibrous glass filaments comprised of lime-aluminum borosilicate glass that is relatively soda free. This known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.000112 to 0.00075 inch, but this is not critical to the present invention.

In general, best properties will be obtained if the sized filamentous glass reinforcement comprises from about 1 to about 80 percent by weight based on the combined weight of glass and polymers and preferably the glass will comprise from about 10 to about 40 percent by weight based on the combined weight of glass and resin. Generally, for direct molding use, up to about 60 percent of glass can be present without causing flow problems. However, it is useful also to prepare the compositions containing substantially greater quantities, e.g., up to 70–80 percent by weight of glass. These concentrates can then be custom blended with blends of resins that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions, it is convenient to use the filamentous glass in the form of chopped strands of from about 1/8 to about 1 inch long, preferably less than 1/4 inch long. In articles molded from the compositions, on the other hand, even shorter lengths will be encountered because, during compounding, considerably fragmentation will occur. This is desirable, however, because the best properties are exhibited by thermoplastic injection molded articles in which the filament lengths lie between about 0.000005 and 0.125 (1/8 inch).

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flame retardant. Sizings, if present, can readily be removed by heat cleaning or other techniques well known to those skilled in the art.

The manner of combining the linear polyester, the ionically crosslinked copolymer and the polytetrafluoroethylene resin is not critical; is conventional; and is obvious to those skilled in the art. These materials as well as any flame retardant, stabilizer, pigment, reinforcement etc., may be preblended and passed through an extruder or fluxed on a mill at a temperature dependent on the particular composition. The mixed composition may be cooled or it may be directly foamed into any desired type of structural unit. Upon extrusion and/or injection molding, the present compositions produce a foamed melt and foamed structure. However, for certain purposes, e.g., a lower density, etc., a foaming agent can also be added to the composition in several different ways which are known to those skilled in the art, for example, by adding liquid or gaseous agents directly to the resin in the extruder while the resin is in the molten state to obtain uniform dispersal of the agent in the molten composition.

The foaming agents can be selected from chemicals containing decomposable groups such as azo, N-nitroso, carboxylate, carbonate, heterocyclic nitrogen containing compounds and sulfonyl hydrazide. Representative compounds include azodicarbonamide, dinitrosopentamethylene tetramine, p,p'-oxy-bis-(isobutyronitrile), biuret and urea. The foaming agent may also consist of normally gaseous agents such as gaseous fluorocarbons as well as gases such as nitrogen, carbon dioxide, air, helium, argon and krypton. Volatile liquids such as pentane, methylene chloride, and liquid fluorocarbons may also be employed in the foaming of the composition.

The temperatures and pressures to which the foamable composition of the invention are subjected to provide a foamed polyester will vary within a wide range, further depending upon the amount and type of foaming agent, if any is used. Preferably, if used, from about 0.02 to about 2.0 weight percent of the foaming agent based on weight of the resin is employed.

The preferred foaming agents are dinitrosopentamethylene tetramine, p-toluene sulfonyl semicarbazide, 5-phenyl-tetrazole, calcium oxalate and trihydrazino-s-triazine.

The polyester resin may be prepared by any of the well known methods outlined above. The filler may be blended with the resin at room temperature. The blend consisting of the polyester resin and the filler is fed into an extruder at a temperature of 480° to about 550° F. The extrudate is then comminuted into pellets or other suitable shapes. If a decomposable chemical foaming agent is used, it can be dry tumbled with the resin. This mixture is then fed into a conventional molding machine. The molding temperature may be from about 500° to about 580° F. with the mold temperature being from about 100° to 250° F., preferably from about 140° to about 200° F. The resulting foam molded product is produced.

If the foaming agent is a liquid or gaseous agent, it may be added directly to the molten resin to obtain uniform dispersal of the agent in the molten resin and thereafter may be injected into a mold to produce a foam molded product.

The foamable composition may be handled in any conventional manner employed for the fabrication or manipulation of polyesters such as low and high pressure injection molding to form products of any desired shape.

DESCRIPTION OF THE PREFERRED EMBODIMENTS

EXAMPLE 1

The following composition is blended and extruded at 500° to 600° F. to form a foamed melt:

| | Parts by Weight |
|---|---|
| Poly(1,4-butylene terephthalate)* | 70.60 |
| Ethylene/methacrylic acid copolymer cross-linked with sodium ions** | .35 |
| Polytetrafluoroethylene resin*** | .35 |
| Aromatic carbonate copolymer of 50 mol. % of tetrabromobisphenol-A and 50 mol. % of bisphenol-A (having an I.V. of about 0.35 in CHCl$_3$ at 30° C.) (flame retardant) | 26.00 |
| Antimony trioxide (Sb$_2$O$_3$) (flame retardant) | 2.50 |

*Having an intrinsic viscosity of about 0.8 to 1.0 as measured in 60:40 phenol-tetrachloroethane at 30° C.
**Surlyn 1555; E. I. duPont de Nemours and Company
***Teflon 6; E. I. duPont de Nemours and Company, particle size 0.3 to 0.7 mm.

The formulation also includes small amounts of conventional antioxidants. Upon injection molding a foamed structure of high toughness is obtained. Even though polytetrafluoroethylene and the copolymer of ethylene/methacrylic acid cross-linked with sodium ions produce melt strands with die swell, the combination of the two materials, with the polyester, produces a synergistic effect.

The molded, foamed composition of Example 1 is tested and found to have a UL-94 rating of V-O in ⅛ inch sections. These blends give exceptionally tough parts as shown by an elongation in excess of 150 percent.

Obviously, many variations are possible in view of the above-detailed description. For example, if the procedure of Example 1 is repeated, substituting polyethylene terephthalate for poly(1,4-butylene terephthalate), a composition according to this invention will be obtained.

If the procedure of Example 1 is repeated, substituting 0.2 and 1.0 wt. percent of the ionomer for 0.35 parts by weight, and 0.2 and 1.0 wt. percent of the polytetrafluoroethylene, and omitting the flame-retardants, compositions according to this invention will be obtained.

If the procedure of Example 1 is repeated, substituting the following ionomers for the ethylene/methacrylic acid copolymer cross-linked with sodium ions:

ethylene/methacrylic acid (10 percent conc.) cross-linked with potassium hydroxide;
ethylene/methacrylic acid (10 percent conc.) cross-linked with magnesium hydroxide;
ethylene/methacrylic acid (10 percent conc.) cross-linked with magnesium acetate;
ethylene/methacrylic acid (10 percent conc.) cross-linked with aluminum hydroxide;
ethylene/methacrylic acid (10 percent conc.) cross-linked with nickel acetate;
ethylene/methacrylic acid (10 percent conc.) cross-linked with cobalt acetate;
ethylene/itaconic acid (10 percent conc.) cross-linked with tin acetate;
ethylene/methacrylic acid (6 percent conc.) cross-linked with sodium hydroxide;
ethylene/itaconic acid (6 percent conc.) cross-linked with strontium hydroxide;

compositions according to this invention will be obtained.

If the procedure of Example 1 is repeated, except that 30 percent by weight of reinforcing fibrous glass filler is included, a foamed, reinforced, flame retardant composition according to this invention will be obtained. If the flame retardant is omitted, and 30 percent by weight of reinforcing fibrous glass filler is included, compositions according to this invention also will be obtained.

Other modifications and variations of the present invention are possible in the light of the above teachings. It is, therefore, to be understood that changes may be made in the particular embodiments of the invention described which are within the full intended scope of the invention as defined by the appended claims.

I claim:

1. A foamed thermoplastic composition which comprises:
   a. a linear polyester resin;
   b. a minor amount of polytetrafluoroethylene resin; and
   c. a minor amount of a copolymer selected from the class consisting of polymers of α-olefins having the general formula RCH = CH$_2$ where R is a radical selected from the class consisting of hydrogen and alkyl radicals having from 1 to 8 carbon atoms, the olefin content of said polymer being at least 50 mole percent, based on the polymer, and an α,β-ethylenically unsaturated mono- or dicarboxylic acid, the acid monomer content of said polymer being from 0.2 to 25 mole percent, based on the polymer, said mono carboxylic acid polymer containing uniformly distributed throughout the polymer a metal ion having a valence of 1 to 3 inclusive and is selected from the group consisting of Na$^+$, K$^+$, Li$^+$, Cs$^+$, Ag$^+$, Hg$^+$, Cu$^+$, Be$^{+2}$, Mg$^{+2}$, Ca$^{+2}$, Sr$^{+2}$, Ba$^{+2}$, Cu$^{+2}$, Cd$^{+2}$, Hg$^{+2}$, Sn$^{+2}$, Pb$^{+2}$, Ca$^{+2}$, Ni$^{+2}$, Al$^{+3}$, Se$^{+3}$, Fe$^{+3}$ and Y$^{+3}$ and said dicarboxylic acid polymer containing a monovalent such ion.

2. A composition as defined in claim 1 wherein said polyester is selected from the group consisting of polymeric glycol terephthalate and isophthalate esters of the general formula:

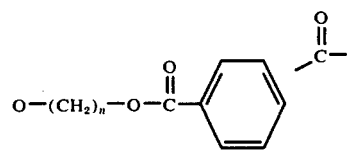

wherein n is a whole number of from 2 to 4, and mixtures of such esters.

3. A composition as defined in claim 1 wherein said polyester is poly (1,4-butylene terephthalate).

4. A composition as defined in claim 1 which includes a flame retardant amount of a flame retardant agent.

5. A composition as defined in claim 1 which includes a reinforcing amount of a reinforcing filler.

6. A composition as defined in claim 5 which includes a flame retardant amount of a flame retardant agent.

7. A foamed thermoplastic composition which comprises:
   a. a high molecular weight poly (1,4-butylene terephthalate) resin; and
   b. an ionic copolymer of an α-olefin having the general formula $RCH = CH_2$ wherein R is a radical selected from the group consisting of hydrogen and alkyl radicals having from 1 to 8 carbon atoms inclusive, the olefin content of said polymer being at least 50 mole percent based on the polymer, and an α,β-ethylenically unsaturated monocarboxylic acid having 3 to 8 carbon atoms, the acid monomer content of said polymer being from 0.2 to 25 mole percent based on the polymer, said polymer containing a metal ion selected from the group consisting of ions of alkali metals and alkaline earth metals uniformly distributed through the polymer in sufficient quantity to neutralize at least 10 percent of said carboxylic acid monomer.

8. A composition as defined in claim 7 wherein said ionic copolymer contains an ion of an alkali metal.

9. A composition as defined in claim 7 wherein said ionic copolymer contains a $Na^+$ ion.

10. A composition as defined in claim 7 wherein said ionic copolymer contains an ion selected from the group consisting of $Li^+$ and $K^+$.

11. A composition as defined in claim 7 wherein the ion is an ion of an alkaline earth metal.

12. A composition as defined in claim 7 wherein the ionic copolymer has at least 50 percent of the carboxylic acid comonomer neutralized by said metal ion.

13. A composition as defined in claim 12 wherein component (b) is an ionic copolymer wherein the α-olefin is ethylene, the carboxylic acid monomer is methacrylic acid and the metal ion is sodium.

14. A composition as defined in claim 7 which includes a reinforcing amount of a reinforcing filler.

15. A composition as defined in claim 7 which includes a flame retardant amount of a flame retardant agent.

16. A composition as defined in claim 15 which includes a reinforcing amount of a reinforcing filler.

* * * * *